United States Patent
Gallina

(10) Patent No.: US 12,492,016 B2
(45) Date of Patent: Dec. 9, 2025

(54) DETERMINATION OF SPACECRAFT INERTIAL PROPERTIES

(71) Applicant: ICEYE Polska Spółka z ograniczoną odpowiedzialnością, Warsaw (PL)

(72) Inventor: Alberto Gallina, Warazawa (PL)

(73) Assignee: ICEYE POLSKA SPÓLKA Z OGRANICZONA ODPOWIEDZIALNOSCIA, Warsaw (PL)

( * ) Notice: Subject to any disclaimer, the term of this patent is extended or adjusted under 35 U.S.C. 154(b) by 0 days.

(21) Appl. No.: 18/855,836

(22) PCT Filed: Apr. 18, 2023

(86) PCT No.: PCT/EP2023/059982
§ 371 (c)(1),
(2) Date: Oct. 10, 2024

(87) PCT Pub. No.: WO2023/203012
PCT Pub. Date: Oct. 26, 2023

(65) Prior Publication Data
US 2025/0250031 A1    Aug. 7, 2025

(30) Foreign Application Priority Data
Apr. 19, 2022 (GB) .................... 2205687

(51) Int. Cl.
*B64G 1/28*   (2006.01)
*B64G 1/10*   (2006.01)

(52) U.S. Cl.
CPC ............ *B64G 1/285* (2013.01); *B64G 1/10* (2013.01)

(58) Field of Classification Search
CPC .......... B64G 1/285; B64G 1/10; B64G 1/242; B64G 1/283; B64G 1/28; B64G 1/286; B64G 1/244; G01M 1/10
See application file for complete search history.

(56) References Cited

U.S. PATENT DOCUMENTS

| 5,123,617 A | 6/1992 | Linder et al. |
| 6,003,818 A | 12/1999 | Shah et al. |
| 2011/0153122 A1 | 6/2011 | Sharma et al. |

FOREIGN PATENT DOCUMENTS

| DE | 10 2018 1186573 B3 | 12/2019 | |
| FR | 2981050 A1 * | 4/2013 | ............. B64G 1/244 |

(Continued)

OTHER PUBLICATIONS

PCT Written Opinion and Search Report issued in connection with PCT Patent Application No. PCT/EP2023/059982 dated Jul. 6, 2023.

(Continued)

*Primary Examiner* — Valentina Xavier
(74) *Attorney, Agent, or Firm* — Cozen O'Connor

(57) ABSTRACT

A method of determining one or more inertial properties of a spacecraft. The method comprises: receiving data collected at different points in time during operation of the spacecraft. The data includes information indicative of: the angular momentum of a reaction wheel on-board the spacecraft, and the angular velocity of the spacecraft. The method further comprises: identifying changes in the angular velocity of the spacecraft based on the information indicative of the angular velocity of the spacecraft; and determining one or more inertial properties of the spacecraft based on the identified changes in the angular velocity of the spacecraft and the information indicative of the angular momentum of the reaction wheel.

16 Claims, 7 Drawing Sheets

(56) References Cited

FOREIGN PATENT DOCUMENTS

RU          2053939 C1      2/1996
RU          2 208 559 C1    7/2003

OTHER PUBLICATIONS

Bergmann E., et al., "Spacecraft Mass Property Identification with Torque-Generating Control", Journal of Guidance and Control and Dynamics., vol. 13, No. 1, dated Jan. 1, 1990, pp. 99-103.
Wertz, Julie A., et al., "In-Flight Estimation of the Cassini Spacecraft's Inertia Tensor", Jet Propulsion Laboratory, CA Institute of Technology, JPL Open Repository, Jan. 1, 2000, pp. 1-14.
Great Britain Office Action issued in connection with related Great Britain Patent Application No. 2205687.3 dated Oct. 14, 2022.
Great Britain Office Action issued in connection with related Great Britain Patent Application No. 2205687.3 dated Aug. 17, 2023.

* cited by examiner

```
------------------------------------------------------------
               I N E R T I A    E S T I M A T E
------------------------------------------------------------
        Elaborated time range  :  8 - 172784 [s]  ~502
504~ Initial time  (UTC+1)     :  2022-02-12 00:00:08
        Final time   (UTC+1)   :  2022-02-13 23:59:44 ~506
508~ Average sample time       :  8.96 [s]
        Average interval time  :  35.85714 [s] ~510
512~ Average Dw                :  0.01354 [rad/s]
------------------------------------------------------------
514~ Total number of samples   :  28
        Bootstrap reps         :  60 ~516
518~ Removed reps due to outliers : 0
        Bootstrap samples      :  10 ~520
------------------------------------------------------------
```

| Parameter | mean | std | CI(95) |
|---|---|---|---|
| Ixx [kgm2] | 10.030 | 0.074 | 10.011 - 10.049 |
| Iyy [kgm2] | 43.466 | 0.298 | 43.391 - 43.542 |
| Izz [kgm2] | 39.714 | 0.095 | 39.690 - 39.738 |
| Ixy [kgm2] | -0.416 | 0.146 | -0.453 - -0.379 |
| Ixz [kgm2] | -0.007 | 0.051 | -0.020 - 0.006 |
| Iyz [kgm2] | -0.355 | 0.091 | -0.378 - -0.332 |

(522 brackets the parameter rows)

```
------------------------------------------------------------
524~ Test for positive definite matrix passed (1:yes/0:no) : 1
------------------------------------------------------------
526~ Smoothness metric [Nms] : 0.00328
------------------------------------------------------------
```

FIG. 5

DETERMINATION OF SPACECRAFT INERTIAL PROPERTIES

This application is the National Stage filing under 35 U.S.C. 371 of International Application No. PCT/EP2023/059982 filed on 18 Apr. 2023, and also claims priority to GB Application No. 2205687.3 filed on 19 Apr. 2022, the contents of both of which are hereby incorporated by reference herein in their entireties to the extent permitted by law.

FIELD OF THE INVENTION

The present application relates to methods and systems for determining the inertial properties of a spacecraft while the spacecraft is in flight. In particular, the present invention may relate to in-flight determinations of the inertial properties of a spacecraft or satellite orbiting the Earth.

BACKGROUND TO THE INVENTION

The inertial properties of an object may be defined by moments and products of inertia (collectively referred to herein as the inertia matrix) and are an important factor in rotational dynamics. A precise and reliable estimate or determination of the inertial properties of a body are important for maintaining an accurate control of the rotation of a body. As the inertial properties are strongly dependent not only on the mass of the body but also on the distribution of the mass across the body's shape and volume, it is not unusual for the inertial properties to change over time. In order for the inertial properties to be measured, a change in the angular velocity and/or angular speed (noting that angular speed is the magnitude of the corresponding angular velocity) of the spacecraft needs to take place. Measurement of the inertial properties can be carried out on Earth prior to launch but accurate measurements can be difficult to obtain because the spacecraft needs to be supported while it is rotated and the reaction of the spacecraft measured.

In the context of spacecraft, this change in the inertial properties presents a challenge to operators. The inertial properties of a spacecraft could change after launch for a number of reasons. For example, the high impulses required to launch a spacecraft into orbit could dislodge a component of the spacecraft (either internal or external) and have it settle into a new position. Such a shift in the mass distribution would lead to a change in the inertial properties of the spacecraft.

For a spacecraft in orbit around the Earth, such as a satellite, the inertial properties could be changed due to other factors including, but not limited to: jettisoning redundant components (e.g., empty fuel tanks); components of the spacecraft becoming dislodged from the spacecraft—either internally or externally—and thus not contributing to the inertial properties; and gradual deterioration of the spacecraft reducing the mass of the spacecraft.

Present methods for determining or estimating the inertial properties of a spacecraft typically involve estimating the inertial properties based on computer-aided design (CAD) models. However, it has been observed by the inventors that estimates based on CAD models regularly underestimate the true inertial properties of the spacecraft. This is, in part, because CAD models are not a true representation of the spacecraft and do not account or manufacturing variances and tolerances, or post-launch changes to the mass distribution (or other configurations) of the spacecraft.

The inventors have devised the claimed invention in light of the above considerations.

The embodiments described below are not limited to implementations which solve any or all of the disadvantages of the known approaches described above.

SUMMARY OF INVENTION

This Summary is provided to introduce a selection of concepts in a simplified form that are further described below in the Detailed Description. This Summary is not intended to identify key features or essential features of the claimed subject matter; variants and alternative features which facilitate the working of the invention and/or serve to achieve a substantially similar technical effect should be considered as falling into the scope of the invention.

In a general sense, the present disclosure provides methods and systems for determining one or more inertial properties of a spacecraft, such as a satellite (including satellites in a low-Earth orbit) while the spacecraft is in-flight, for example performing normal operations.

The invention is defined as set out in the appended set of claims.

In a first aspect of the present invention, there is provided a method of determining one or more inertial properties of a spacecraft, the method comprising: receiving data collected at different points in time during operation of the spacecraft, the data including information indicative of: the angular momentum of a reaction wheel on-board the spacecraft, and the angular velocity of the spacecraft; identifying changes in the angular velocity of the spacecraft based on the information indicative of the angular velocity of the spacecraft; and determining one or more inertial properties of the spacecraft based on the identified changes in the angular velocity of the spacecraft and the information indicative of the angular momentum of the reaction wheel.

In another aspect, there is provided a computing device comprising a processor configured to carry out the methods described herein.

In another aspect, there is provided a computer-readable medium comprising logic that, when executed by a computer, causes the computer to carry out the methods described herein.

In another aspect, there is provided a computer program product comprising instructions that, when executed by a computer, cause the computer to carry out the methods described herein.

The methods described herein may be performed by software in machine readable form on a tangible storage medium e.g., in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is issued for designing silicon chips, or for configuring universal programmable chips, to carry out desired functions.

The features and embodiments discussed above may be combined as appropriate, as would be apparent to a person skilled in the art, and may be combined with any of the aspects of the invention except where it is expressly provided that such a combination is not possible or the person skilled in the art would understand that such a combination is self-evidently not possible.

BRIEF DESCRIPTION OF THE DRAWINGS

Embodiments of the present invention are described below, by way of example, with reference to the following drawings.

FIG. 5 shows a display interface that may be presented to a user comprising the data returned to the user as part of the method shown in FIG. 3.

Figure 1:
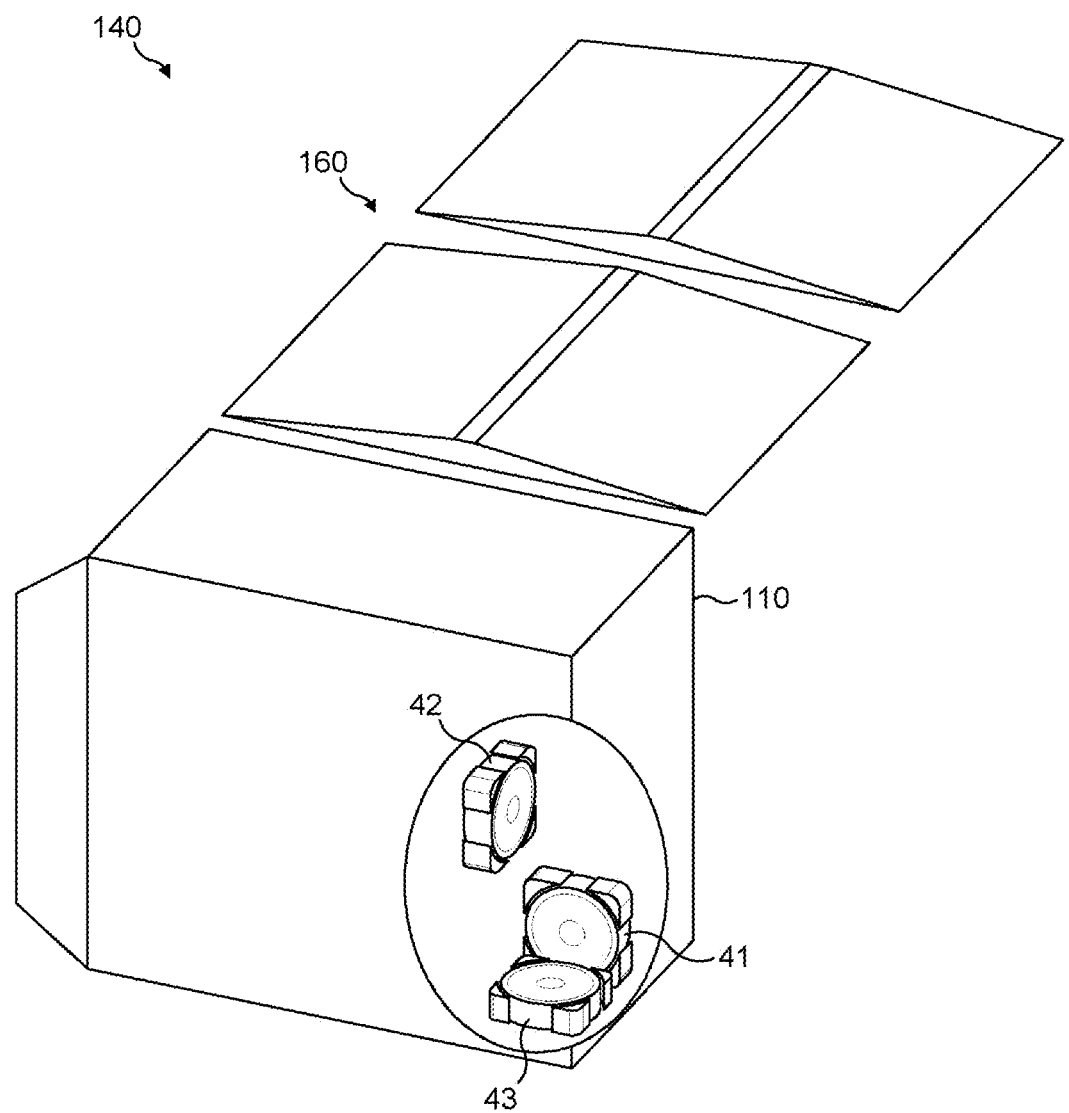
FIG. 1 shows a perspective sectional view of a satellite having three reaction wheels arranged on-board the satellite to control the rotation of the satellite in three different axes that are orthogonal to each other.

Common reference numerals are used throughout the figures to indicate the same or similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a partial perspective sectional view of a space craft 140, in this example a satellite, the inertial properties of which may be determined using any of the methods described here. Further details of a satellite of this kind may be found for example in GB2578793A. The satellite comprises a body 110 and generally planar structures extending from the body 110 in two opposing directions to provide two "wings" 160, only one of which is shown in FIG. 1. One or more antennas as described above may be mounted on the satellite "wings". Other components may be mounted on the wings as is known in the art including power distribution components and amplifiers.

The body 110 may house components such as a power source, power distribution system, computing system and communication system, collectively referred to in the art as the satellite "bus". Further the body may house the attitude determination and control system "ADCS".

The ADCS may be implemented in a number of ways. The ADCS is shown in FIG. 1 to comprise a set of reaction wheels. The reaction wheels are usually, but not necessarily, located in the satellite body 110. FIG. 1 shows a set of three reaction wheels 41, 42, 43 located in the satellite body 110. Reaction wheels are sometimes also known as momentum wheels.

The reaction wheels may be a type of flywheel with an electrical motor configured to provide three-axis control of the spacecraft, enabling the spacecraft to rotate in any direction without the need to activate thrusters or any other components that would consume (non-renewable) fuel. In some examples, the reaction wheel may be implemented as a control moment gyroscope, or similar.

While a satellite is depicted in FIG. 1, the skilled person will appreciate that the methods and systems described herein apply equally to any spacecraft 140 including, for example, space stations, rockets, space shuttles, and any other spacefaring vehicle in orbit around the earth. Further, while the satellite is depicted with an on-board reaction wheel 41-43, the skilled person will appreciate that additional or alternative momentum-controlling components could be on-board the satellite. Such components may include, for example, thrusters, and/or torque rods. The torque rods may, in some examples, be magnetorquers.

The satellite or other spacecraft 140 may be in a low-Earth orbit. A low-Earth orbit may be classified as an orbit having a period of 128 minutes or less and an eccentricity of 0.25 or less. Additionally or alternatively, a low-Earth orbit may be classified as an orbit with an altitude of 2000 km or less, 1000 km or less, or 600 km or less. Satellites in a low-Earth orbit may be particularly well-suited to the methods disclosed herein due to the high-dynamic nature of their orbits.

The satellite or other spacecraft 140 may have a mass of 5 tonnes or less, 2 tonnes or less, or 1 tonne or less.

Light satellites, sometimes referred to as micro-satellites, will have relatively low inertial properties, e.g., moments and products of inertia, as a consequence of their low mass. The methods described herein may be particularly effective for determining an estimate of the inertial properties of such a satellite, despite the relatively low value of each of the elements of the satellite's inertial properties.

In one aspect there is provided here a method of determining one or more inertial properties of a spacecraft. The method comprises: receiving data collected at different points in time during operation of the spacecraft, the data including information indicative of: the angular momentum of a reaction wheel on-board the spacecraft, and the angular velocity of the spacecraft. Changes in the angular velocity of the spacecraft are identified based on the information indicative of the angular velocity of the spacecraft; and one or more inertial properties of the spacecraft are determined based on the identified changes in the angular velocity of the spacecraft and the information indicative of the angular momentum of the reaction wheel.

The method may be performed in a computing system on board the spacecraft or it may be performed at another location, for example in a computing system on earth.

A specific example of this method will now be described with reference to FIG. 2.

Figure 2:
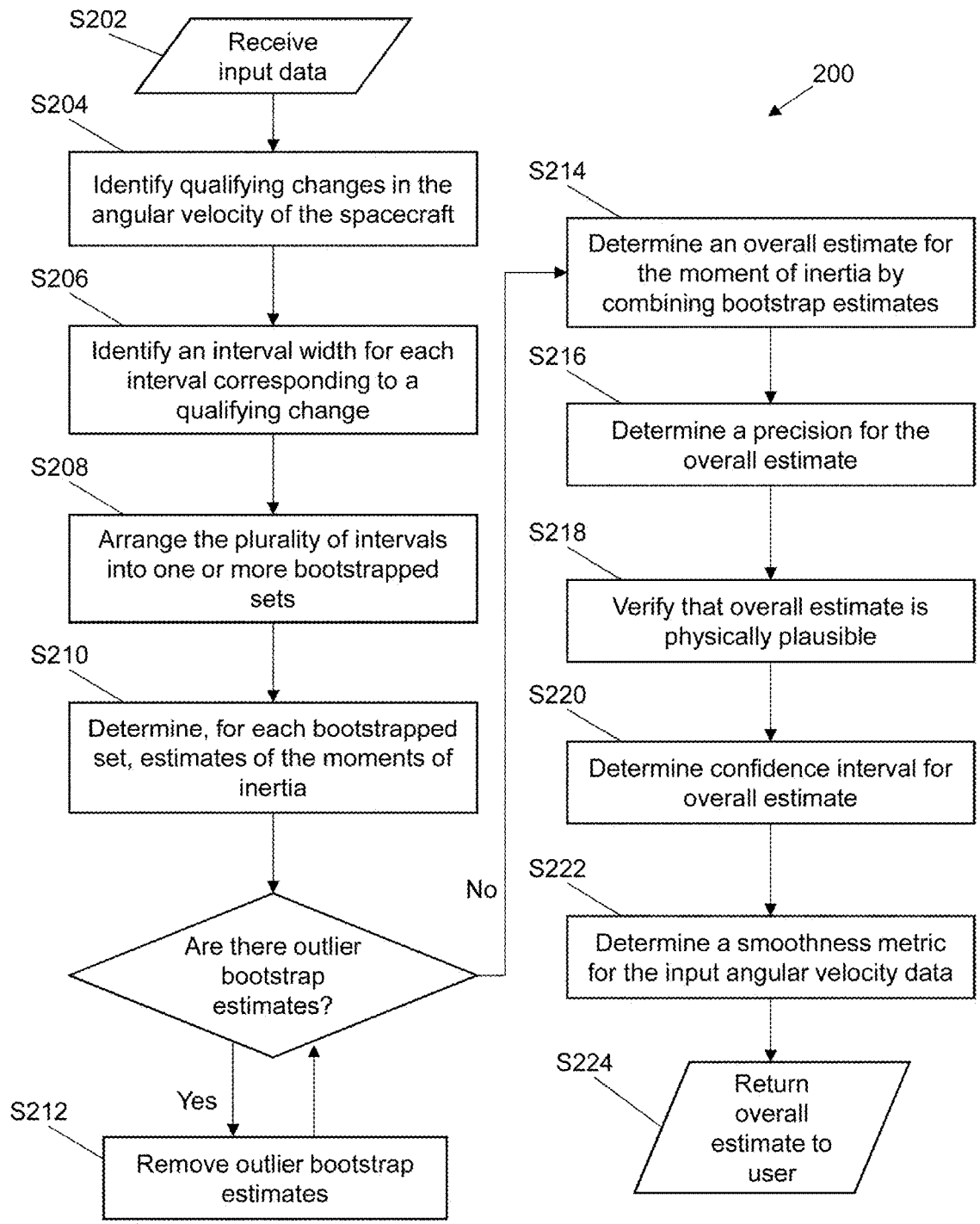
FIG. 2 shows a method of determining the inertial properties of a spacecraft such as that shown in FIG. 1.

FIG. 2 shows a method 200 of determining the inertial properties of a spacecraft such as the satellite 140 shown in FIG. 1.

A first operation S202 comprises receiving the data, collected at different points in time during operation of the spacecraft, as input data. The data is indicative of the angular momentum of a reaction wheel on-board the spacecraft, and the angular velocity of the spacecraft. In other words it may be any data from which the angular momentum of a reaction wheel, and the angular velocity of the spacecraft may be determined. In the following example the input data comprises measurements of the angular velocity of the spacecraft over time, the angular momentum of the reaction wheel 41-43, or momentum wheel, over time, and the angular momentum of the torque rods over time. In some examples, such as those expanded upon herein, angular velocity may be measured in radians per second (rad s$^{-1}$) and angular momentum may be measured in Newton-metre-seconds (N m s), although the skilled person will, of course, be aware of other appropriate units.

The spacecraft, for which the inertial properties is being determined may be a platform for imaging apparatus and the input data received in operation S202 is collected during operation of the spacecraft to obtain images of a target area on Earth.

For example, the spacecraft may comprise a satellite comprising synthetic aperture radar apparatus.

Spacecraft, including satellites, that are configured to image the Earth, e.g., by collecting images (such as synthetic aperture radar images) may be regularly re-pointed at various targets. In other words, in addition to the dynamics associated with the satellite's orbit around the earth, either to maintain or change orbit, there may be additional rotational dynamics arising from the active pointing of the satellite at an imaging target. For example, the spacecraft ADCS may be configured for mechanically steering the satellite in the azimuth direction to prolong a dwell time, during which a selected target is visible from the satellite, as the satellite orbits over the target, in other words the mechanical steering may maintain a target on the earth within the radar aperture.

In the methods described here, any of these dynamics, in other words changes in motion, may be used to determine one or more inertial properties of the spacecraft. In some methods, data relating to changes in angular velocity required to maintain the spacecraft in its orbit are used to determine inertial properties of the spacecraft. Additionally or alternatively, the methods may use data relating to changes in angular velocity required for a particular imaging operation. In any of the methods the data may be obtained at a lower sampling frequency than would normally be expected to be required to determine inertial properties.

Therefore the data received at operation S202 may be collected while the spacecraft is performing one or more routine manoeuvres, for example but not limited to maintaining or changing orbit or maintaining a target within the radar aperture as is possible with new smaller and more agile satellites.

These operations of the spacecraft may be considered to be standard day-to-day or 'normal' flight operations. Normal flight operations may be understood as being flight operations that are scheduled for the spacecraft to carry out its flight plan. The flight plan may, for example, be a pre-approved flight plan. The flight plan, in some examples, may be adjusted either manually by an operator, or automatically upon fulfilment of certain conditions (e.g., triggering a collision warning may cause the flight plan to be adjusted to avoid collision). In particular, the input data received in operation S202 above may be collected during these normal flight operations; this may be understood as meaning that the spacecraft is not required to perform dedicated manoeuvres for the express purpose of collecting data associated with the angular velocity of the spacecraft (and angular momentum of the reaction wheels 41-43). Instead, the data can be collected essentially as part of a background operation such that the data collection and subsequent analysis does not interfere with the manoeuvres and operations of the spacecraft. This may have significant advantages over systems where the spacecraft is required to perform dedicated manoeuvres for the purpose of determining the inertial properties of the spacecraft because such dedicated manoeuvres require specific, and potentially costly, programming of the spacecraft. Such dedicated manoeuvres also result in a loss of spacecraft operation time, i.e., the owner/user of the spacecraft loses time that could otherwise be spent carrying out the flight mission of the spacecraft.

Determining the inertial properties of the spacecraft based on data collected during operations of the spacecraft serves to improve the accuracy of the determinations of the inertial properties. When used herein, it will be appreciated that the term 'determination' can and should be construed to include approximation and/or estimate, and vice versa.

In particular, the determination of inertial properties of the spacecraft, while the spacecraft is in-flight, may not suffer from the inaccuracies that terrestrial measurements are susceptible to. Additionally, by determining the inertial properties of the spacecraft based on up-to-date data, the determination may be sensitive to changes in the inertial properties over the course of the lifetime of the spacecraft.

The input data may be telemetry data collected during normal flight operations of the spacecraft. Telemetry data may be understood as being data that is collected in situ on-board the spacecraft and transmitted from the spacecraft, for example to a station on the ground. For example, the telemetry data may be received at a ground station, on a user's computing device such as a mobile device or similar.

By implementing the methods disclosed herein off-board the spacecraft, it is possible to reduce the payload of the spacecraft by eliminating the need for dedicated processing capability on-board the spacecraft. This, in turn, reduces the costs and complexity associated with launching the spacecraft and maintaining it in orbit, or along its flight plan. However, it is not essential for the determination to take place off-board and it may take place on-board the spacecraft if processing capability permits.

In any of the methods described here, the input data received at operation S202 may be collected with a relatively low sampling frequency, for example with a sampling frequency of 5 Hz or less, 2 Hz or less, 1 Hz or less, 0.5 Hz or less, 0.2 Hz or less, 0.1 Hz or less, 0.05 Hz or less, or 0.01 Hz or less. Such frequencies are typical for telemetry data collected from spacecraft. The sampling frequency may be constant or may vary over time. In one example, the sampling frequency with which the input data is collected is, on average, 0.125 Hz and does not exceed 0.17 Hz.

The methods described herein may be particularly well-suited for processing data that is collected with a lower sampling frequency than may be found in the state of the art. In some examples, bootstrapping the data (as is discussed in more detail below) may facilitate determining inertial properties from a relatively low number of samples—i.e., collecting with a relatively low sampling frequency. This may consequently reduce the costs and computing requirements associated with implementing the methods disclosed herein.

The methods described herein, in contrast to previous attempts to determine the inertial properties of a spacecraft, are advantageous in that they are compatible with data that is (i) collected during the normal flight operations of the spacecraft, i.e., it is not necessary to disturb the normal flight operations of the spacecraft, and (ii) collected with a relatively low sampling frequency—for example telemetry data or other data collected with a sampling frequency of 5 Hz or less, 2 Hz or less, 1 Hz or less, 0.5 Hz or less, 0.2 Hz or less, or 0.1 Hz or less.

Referring again to FIG. 2, in the example method shown a subsequent operation S204 comprises identifying, in the dataset, qualifying changes in the angular velocity of the spacecraft.

As noted above these changes in the angular velocity may occur due to the normal flight operations of the spacecraft. It is preferable for the identified changes in the angular velocity to arise from the normal flight operations of the spacecraft as this may avoid interference with the normal operations of the spacecraft that might occur for example if a specific manoeuvre was carried out only for the purpose of determining the inertial properties.

Figure 3:
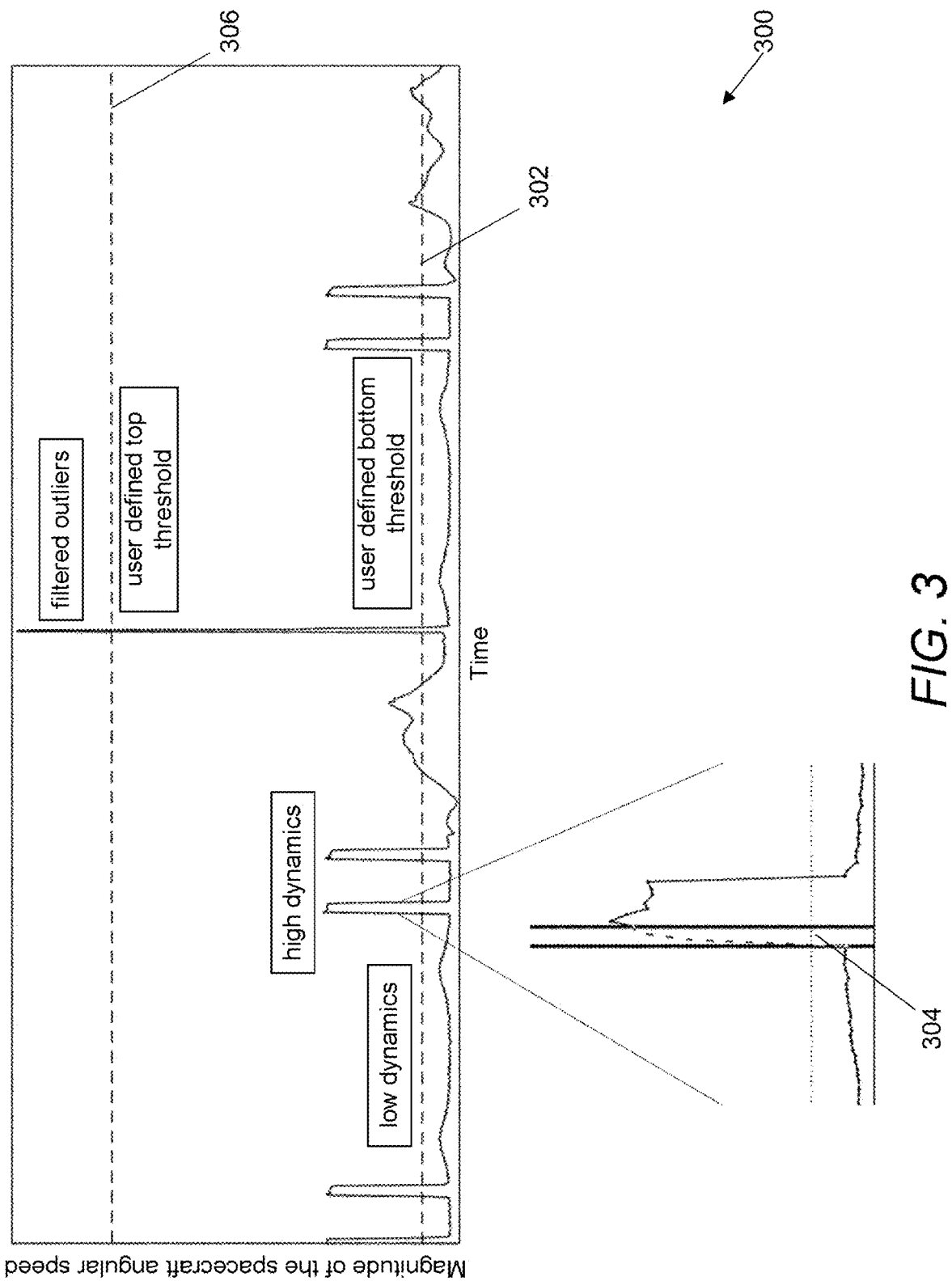
FIG. 3 shows a graph depicting the angular speed of the spacecraft of FIG. 1 plotted against time.

In order for a change in the angular velocity of to be identified as a qualifying change, the change may need to satisfy one or more of exceeding a predetermined lower threshold, not exceeding a predetermined upper threshold, and occurring within a predetermined time window. In operation S204, the change may need to exceed a predetermined lower threshold within a predetermined time window. This is illustrated, for example, in FIG. 3. FIG. 3 shows a graph 300 depicting the angular speed of the spacecraft plotted against time. The predetermined lower threshold 302 is indicated on the graph 300 by dashed line 302. The predetermined time interval 304 is indicated on the graph 300 by the solid lines 304 in the cutaway of the graph 300.

The predetermined lower threshold 302 may be 0.01 rad $s^{-1}$ or less, 0.005 rad $s^{-1}$ or less, 0.001 rad $s^{-1}$ or less, or $5 \times 10^{-4}$ rad $s^{-1}$ or less. In one example, such as that shown in FIG. 3, the predetermined lower threshold 302 is 0.004 $\text{rad}^{-1}$.

The predetermined time window 304 may be 300 seconds or less, 180 seconds or less, 120 seconds or less, 90 seconds or less, 60 seconds or less, 45 seconds or less, or 30 seconds or less. In some examples, the predetermined time window 304. In one example, such as that shown in FIG. 3, the predetermined time window 304 is 120 seconds. By requiring the change in angular velocity to occur within the predetermined time window 304, it is possible to limit the analysis of the data to situations where (due to the large change in angular velocity over a relatively short space of time) the change in angular velocity can be modelled as substantially linear.

In some examples, in order for a change in the angular velocity to be identified as a qualifying change in operation S202, the change may need to not exceed a predetermined upper threshold 306. In this way, erroneous, nonsensical and/or non-physical data may be discounted from the processing that is used to determine the inertial properties of the spacecraft. The predetermined upper threshold 306 is indicated on the graph 300 by dashed line 306.

The predetermined upper threshold 306 may be 0.01 rad $s^{-1}$ or more, 0.02 rad $s^{-1}$ or more, 0.05 rad $s^{-1}$ or more, or 0.1 rad $s^{-1}$ or more. In one example, such as that shown in FIG. 3, the predetermined upper threshold 306 is 0.03 rad $s^{-1}$.

The determining of the one or more inertial properties of the spacecraft may then be based only on the identified qualifying changes in the angular velocity of the spacecraft.

A qualifying change in the angular velocity may be one whose magnitude is such that it is statistically significant and/or physically plausible. For example, in order to be a qualifying change, the change may need to exceed a lower threshold 302 so that the change can be considered to be statistically significant. Additionally or alternatively, in order to be a qualifying change, the change may need to not exceed an upper threshold 306 so that the change can be considered to be physically plausible—i.e., not an anomalous measurement. These thresholds may be applied simultaneously such that, in order to be a qualifying change, the change may need to lie in a range between the lower and upper thresholds 302, 306.

In other words, the determination of the inertial properties of the spacecraft may be based only on changes in the angular velocity of the spacecraft that are deemed to be statistically significant and/or physically plausible, i.e., not all variations in the data received in operation S202 will be considered when determining the inertial properties of the spacecraft.

In this way, the reliability of the determination may be improved because it can be ensured that the determination is based on bona fide changes in the angular velocity of the spacecraft and not on statistically insignificant variations such as noise or anomalous measurements.

The determination of one or more inertial properties may comprise identifying a plurality of time intervals, each interval corresponding to a change in the angular velocity of the spacecraft upon which the determining is to be based. The plurality of time intervals is then randomly sampled to generate one or more sets of intervals, wherein the number of time intervals within each of the sets of intervals is less than the total number of time intervals. This may use a process analogous to the known statistical process of boot-strapping. For each set of intervals, a set estimate is determined of the inertial properties, based on the plurality of time intervals in the respective set of intervals. The one or more set estimates are then combined to determine an overall estimate of the inertial properties.

In the specific example of FIG. 2, subsequent to identifying the qualifying changes in the angular velocity in operation S204, operation S206 comprises identifying a time interval width associated with each of a plurality of time intervals, wherein each time interval corresponds to one of the identified qualifying changes in angular velocity. Each time interval may be indicative of the time over which the corresponding qualifying change in angular velocity occurs, in contrast to the time window within which the change must have occurred in order to qualify. The time intervals, simply referred to in the following as "intervals" may correspond to increases in the angular velocity of the spacecraft, to decreases in the angular velocity of the spacecraft, or to both increases and decreases in the angular velocity of the spacecraft.

In some examples, identifying the interval width may comprise determining, for each qualifying change in the angular velocity, a start time and a stop time for the change. Additionally, in some examples, identifying the interval width of each interval may further comprise determining an average interval width of all of, or a subset of the intervals. Determination of the average interval width may be useful in estimating or verifying the sampling frequency of the data.

In some examples, the average interval width may be 5 seconds or less, 10 seconds or less, 30 seconds or less, 45 seconds or less, or 1 minute or less. In one example, such as that shown in FIG. 3, the average interval width is 35 seconds. In many examples, the interval width is dependent upon the received data, in particular based on the duration of the manoeuvres that are performed by the spacecraft 110 that involve a change in the angular velocity that is identified as a qualifying change.

Subsequently, operation S208 comprises arranging the plurality of intervals into one or more sets of intervals. The process of arranging the intervals into the one or more sets, also referred to as bootstrapped sets, is discussed in more detail in relation to FIG. 4 below.

Subsequently, operation S210 comprises determining, for each set of intervals, estimates of the inertial properties of the spacecraft.

Determining estimates of the inertial properties of the spacecraft 110 may involve estimating a solution to the integrated form of the Euler Rigid-Body dynamic equation. In some examples, it may be assumed that no external torques are acting on the spacecraft. In such instances, the Euler Rigid-Body dynamic equation may be expressed as:

$$\int_0^t \overline{\overline{I_{sc}}} \cdot d\vec{\omega} + \int_0^t d\vec{h} + \int_0^t \vec{\omega} \times \left(\overline{\overline{I_{sc}}} \cdot \vec{\omega} + \vec{h}\right) dt = \vec{0}$$

wherein $\overline{\overline{I_{sc}}}$ is a tensor representing the inertial properties of the spacecraft, $\vec{\omega}$ is the angular velocity vector of the spacecraft, and $\vec{h}$ is an angular momentum vector representing the combined angular momentum of the reaction wheels 41-43 and torque rods on board the spacecraft. In some examples, the angular momentum of the torque rods may not be included in the angular momentum vector because its impact on the overall dynamics of the satellite may, in some examples, be negligible compared to the angular momentum of the reaction wheels 41-43.

The inertial properties tensor, $\overline{\overline{I_{sc}}}$, may be a 3×3 matrix, wherein the matrix comprises the moments and products of inertia of the spacecraft 100:

$$\overline{\overline{I}} = \begin{pmatrix} I_{xx} & I_{xy} & I_{xz} \\ I_{xy} & I_{yy} & I_{yz} \\ I_{xz} & I_{xy} & I_{zz} \end{pmatrix}$$

The diagonal elements of the inertial properties tensor represent the moments of inertia of the spacecraft, while the off-diagonal elements of the inertial properties tensor represent the products of inertia of the spacecraft. The moments of inertia may be understood as an indicator of the tendency of an inertial body to resist angular acceleration about a respective axis. The products of inertia may be understood as an indicator of the degree of symmetry (or asymmetry) of the mass distribution of an inertial body across a respective plane.

The Euler Rigid-Body equation as expressed above, may be recast in a linear algebra form that is more suitable for numerical integration as:

$$\overline{\overline{A}} \cdot \vec{i} + \vec{b} = \vec{0}$$

wherein the inertial properties tensor has been re-cast as a six-component column vector:

$$\vec{i} = (I_{xx} \; I_{yy} \; I_{zz} \; I_{xy} \; I_{xz} \; I_{xy})^T$$

and wherein the tensor, $\overline{\overline{A}}$, can be expressed as:

$$\overline{\overline{A}} = \overline{\overline{\Omega}}(t) - \overline{\overline{\Omega}}(0) + = \int_0^t \overline{\overline{f}}(\vec{\omega}) dt$$

wherein:

$$\overline{\overline{\Omega}} = \begin{pmatrix} \omega_x & 0 & 0 & \omega_y & \omega_z & 0 \\ 0 & \omega_y & 0 & \omega_x & 0 & \omega_z \\ 0 & 0 & \omega_z & 0 & \omega_x & \omega_y \end{pmatrix}$$

$$\overline{\overline{f}}(\vec{\omega}) = \begin{pmatrix} 0 & -\omega_y\omega_z & \omega_y\omega_z & -\omega_x\omega_z & \omega_x\omega_y & \omega_y^2 - \omega_z^2 \\ \omega_x\omega_z & 0 & -\omega_x\omega_x & \omega_y\omega_z & \omega_z^2 - \omega_x^2 & -\omega_x\omega_y \\ -\omega_x\omega_y & \omega_x\omega_y & 0 & \omega_x^2 - \omega_y^2 & -\omega_y\omega_z & \omega_x\omega_z \end{pmatrix}$$

and wherein the vector, $\vec{b}$, can be expressed as:

$$\vec{b} = \vec{h}(t) - \vec{h}(0) + \int_0^t \vec{g}(\vec{\omega}, \vec{h}) dt$$

$$\vec{g}(\vec{\omega}, \vec{h}) = \begin{pmatrix} \omega_y h_z - \omega_z h_y \\ \omega_z h_x - \omega_x h_z \\ \omega_x h_y - \omega_y h_x \end{pmatrix}$$

The linear algebra version of the Euler Rigid-Body equation, $\overline{\overline{A}} \cdot \vec{i} + \vec{b} = \vec{0}$, may be computed by simply inverting the tensor (or matrix), $\overline{\overline{A}}$, to determine the inertial properties vector. Each of the relevant integrals may be computed using standard numerical integration techniques, for example Simpsons' rule of numerical integration or another appropriate method, such as a 'least-squares' method, implementation of the trapezium rule or Gauss' integrate method. In some examples, the determination may involve multiple time step integration. Alternatively, the determination may involve single time step integration. In some examples, a user may be able to select between single time step and multiple time step integration according to their need and/or preference.

Operation S210 comprises determining, for each interval corresponding to a qualifying change in the angular velocity of the spacecraft, respective estimates for the tensor (or matrix) $\overline{\overline{A}}$ and vector $\vec{b}$ based on a numerical integration of the parameters outlined above over the duration of the corresponding time interval.

Operation S210 further comprises determining a set estimate of the inertial properties for each set of intervals by combining, for all of the intervals put into the set of intervals, each of the respective estimates of the tensor (or matrix) A, and each of the respective estimates of the vector $\vec{b}$.

Combining each of the respective estimates of the tensor and/or the vector may involve concatenating the estimates and/or arranging the estimates in respective tensors. For example, for a given ($m^{th}$) set of intervals, if there are n intervals within the set each having their respective estimates for the tensor (or matrix) $\overline{\overline{A}}_n$ and vector $\vec{b}_n$, then the combinations may be expressed as:

$$\langle \overline{\overline{A}} \rangle_m = \begin{bmatrix} \overline{\overline{A}}_1 \\ \vdots \\ \overline{\overline{A}}_n \end{bmatrix};$$

$$\langle \vec{b} \rangle_m = \begin{bmatrix} \vec{b}_1 \\ \vdots \\ \vec{b}_n \end{bmatrix}$$

The inertial properties may be consequently estimated for the given ($m^{th}$) set of intervals by a least-squares inversion of the tensor $\langle \overline{\overline{A}} \rangle_m$:

$$i_m = \langle \overline{A} \rangle_m^{-1} \langle \vec{b} \rangle_m$$

In some examples, to improve the accuracy of a final overall estimation of the inertial properties, operation S212 comprises removing set estimates that are determined to be outlier estimates. Determining that a set estimate is an outlier estimate may involve determining that the difference between the set estimate and an average set estimate of the inertial properties differs by an amount exceeding a predetermined outlier threshold. The outlier threshold may, for example, be a 2-sigma deviation from the average set estimate or more, a 3-sigma deviation from the average set estimate or more, a 4-sigma deviation from the average set estimate or more, or a 5-sigma deviation from the average set estimate or more. An n-sigma deviation may be understood as being a deviation from the average of a dataset equal to n standard deviations of said dataset.

Subsequently, operation S214 comprises determining an overall estimate of the inertial properties by combining each of the estimates of the inertial properties for each of the sets of intervals, herein referred to as set estimates. Combining the set estimates may comprise taking an average, e.g. the mean average, of each of the set estimates:

$$I = \frac{1}{m} \sum_{k=1}^{m} i_k$$

As noted above, operation S208 may be understood as a variation on bootstrapping. Bootstrapping is a statistical analysis technique in which an initial dataset is resampled. For example, in the methods described herein, the collected data constitutes an initial sample of the angular velocity of the spacecraft (and the angular momentum of the reaction wheels 41-43). The bootstrapping, as applied to this data, is the arrangement of time intervals derived from the received data by randomly sampling the time intervals to generate the sets of intervals discussed above. The number of time intervals in each set may be predetermined. The time intervals may be present in a set in an order different from their chronological order. Further, as a result of the random sampling, it is possible for the same time interval to be present more than once in each set.

By applying a bootstrapping technique, it is possible to obtain more reliable estimates of the inertial properties of the spacecraft and to determine estimates of the error in the determination and, as discussed below, confidence intervals in the determination. Additionally, the use of bootstrapping techniques facilitates the parsing of data that has been sampled over an extended period of time (e.g., several hours, days, weeks, etc.) to reduce the size of the dataset so that the processing cost associated with determining the inertial properties of the spacecraft 110 is reduced. This may be necessary when the determination of the inertial properties of the spacecraft 110 are based on 'normal', or day-to-day operations because it may take an extended period of time, e.g., several hours, days, weeks or more, to obtain sufficient data to be able to reliably determine an estimate of the inertial properties of the spacecraft 110. Further, by applying bootstrapping techniques, it is possible (as discussed below) to obtain estimates of the accuracy and reliability of the determined estimates of the spacecraft's inertial properties. It may not be possible to obtain such estimates and determinations when applying other techniques without expending more processing power and time than is required when implementing the methods disclosed herein.

In some examples, a further operation S216 comprises determining a precision for the overall estimate of the inertial properties based on the one or more set estimates. Determining the precision for the overall estimate may involve determining the standard deviation of the set estimates:

$$\sigma_I = \sqrt{\frac{\sum_{k=1}^{m} (i_k - I)^2}{m}}$$

It may be advantageous to determine a precision of the overall estimate of the inertial properties of the spacecraft so that the user is able to ascertain the reliability of the overall estimate.

In some examples, a further operation S218 may comprise verifying that the overall estimate of the inertial properties is within a predetermined range, and/or verifying that each component of the inertial properties lies within a predetermined range, for example to check that the estimates are physically plausible.

Verifying that the estimate of the inertial properties lies within a predetermined range may involve verifying that the inertial properties tensor discussed above is a positive-definite matrix. By definition, the inertial properties tensor should be symmetric (because the products of inertia symmetrically occupy the off-diagonal positions in the tensor). Therefore, verifying that the inertial properties tensor is a positive-definite matrix may involve verifying that the eigenvalues of the inertial properties tensor all have real, positive values.

Verifying that the estimate of the inertial properties of the spacecraft lies within a predetermined range may be useful to verify that the overall estimate of the inertial properties is physically plausible. In other words, the predetermined range may be constrained so that inertial properties lying within the range define moments and products of inertia having physically reasonable values. This may be based on physics-based considerations (e.g., that the moments of inertia must be positive) or on constraints based on the parameters of the spacecraft such as size, mass, component distribution (e.g., the location of the reaction wheel(s) 41-43, any thrusters, on-board computing devices, torque rods, etc.), or any other parameter that may constrain the moments and products of inertia.

Verifying that the overall estimate is physically plausible may comprise verifying that the eigenvalues of the overall estimate I are positive-definite, i.e., that each of the eigenvalues is a real number greater than zero. This operation may serve as an important check that the estimation is physically plausible. Verifying that the overall estimate is physically plausible may additionally or alternatively involve verifying that each of the eigenvalues of the positive-definite matrix lies within a predetermined range decided upon based on the mass, and shape of the spacecraft as manufactured.

By verifying that the overall estimate of the inertial properties of the spacecraft is physically plausible, it is possible for the user to spot-check that the method has been successfully implemented.

In some examples, a further operation S220 may comprise determining a confidence interval for the overall estimate of the inertial properties based on the one or more set estimates. For example, operation S220 may comprise determining a 99% confidence interval, 95% confidence interval, a 90% confidence interval, an 80% confidence interval, or similar. For illustrative purposes, in some examples, a 95% confidence interval may be determined as:

$$I_{C95} = I - \frac{1.96\sigma_I}{\sqrt{m}} : I + \frac{1.96\sigma_I}{\sqrt{m}}$$

Determining a confidence interval may be beneficial for the user of the method in some contexts where the precise value of the inertial properties of the spacecraft may not be necessary, but it is necessary to have a good understanding of what range of values the value of the inertial properties lie within.

In some examples, a further operation S222 may comprise determining a smoothness metric for the angular velocity data. The smoothness metric may be useful for verifying the accuracy of the overall estimate of the inertial properties. For example, a lower smoothness metric may be obtained if the accuracy of the overall estimate of the inertial properties is greater. Determining the smoothness metric may involve determining the magnitude of an overall angular momentum vector, $\vec{H}$, over time:

$$H = |\vec{H}| = |\overrightarrow{\omega_{sc}} \cdot \overline{I} + \vec{h}|$$

Determining the smoothness metric may further comprise applying a median filter to the angular velocity data to smooth the data without removing genuine features from the angular velocity data, i.e., the median filter may be used to remove noise but not true 'edges' in the dataset. The smoothness metric, $H_{rms}$, may then be determined as:

$$H_{rms} = \sqrt{\sum \frac{(H_{filtered} - H_{median})^2}{N}}$$

wherein, after filtering, there are N data points in the input angular velocity data for which the magnitude of the overall angular momentum vector has been determined. In other words, the smoothness metric may quantify the root-mean-square deviation between each angular momentum data point that is passed through the median filter and the median of the angular momentum. When the smoothness metric is determined based on the equation above, the more accurate the overall estimate of the inertial properties is, the lower the smoothness metric will be.

A final operation S224 comprises returning the determined overall estimate of the inertial properties to the user of the method. Operation S224 may be carried out automatically or may be initiated at the request of the user. Operation S224 may further comprise returning metadata or other information to the user that they may wish to be provided with in addition to the overall estimate of the inertial properties. In an example, the data returned in operation S224 may be presented as set out in FIG. 5.

The data returned in operation S224 includes the determined overall estimate of the inertial properties of the spacecraft. This may include estimates of the moments and products of inertia of the satellite. These estimates may be used by a controller of the spacecraft to maintain an accurate control of the rotation of the spacecraft. For example, if the returned estimates indicate that a moment of inertia of the spacecraft has changed relative to the initial moment of inertia as measured in the lab pre-launch, then the controller may change the amount of impulse delivered (or instructed to be delivered) to deliver a required or desired degree of rotation relative to the amount of impulse that would have been delivered had the moment of inertia not changed. In some examples, the controller of the spacecraft may adapt the amount of impulse to be delivered as a result of a determined change in any of the inertial properties of the spacecraft, as appropriate.

Figure 4:
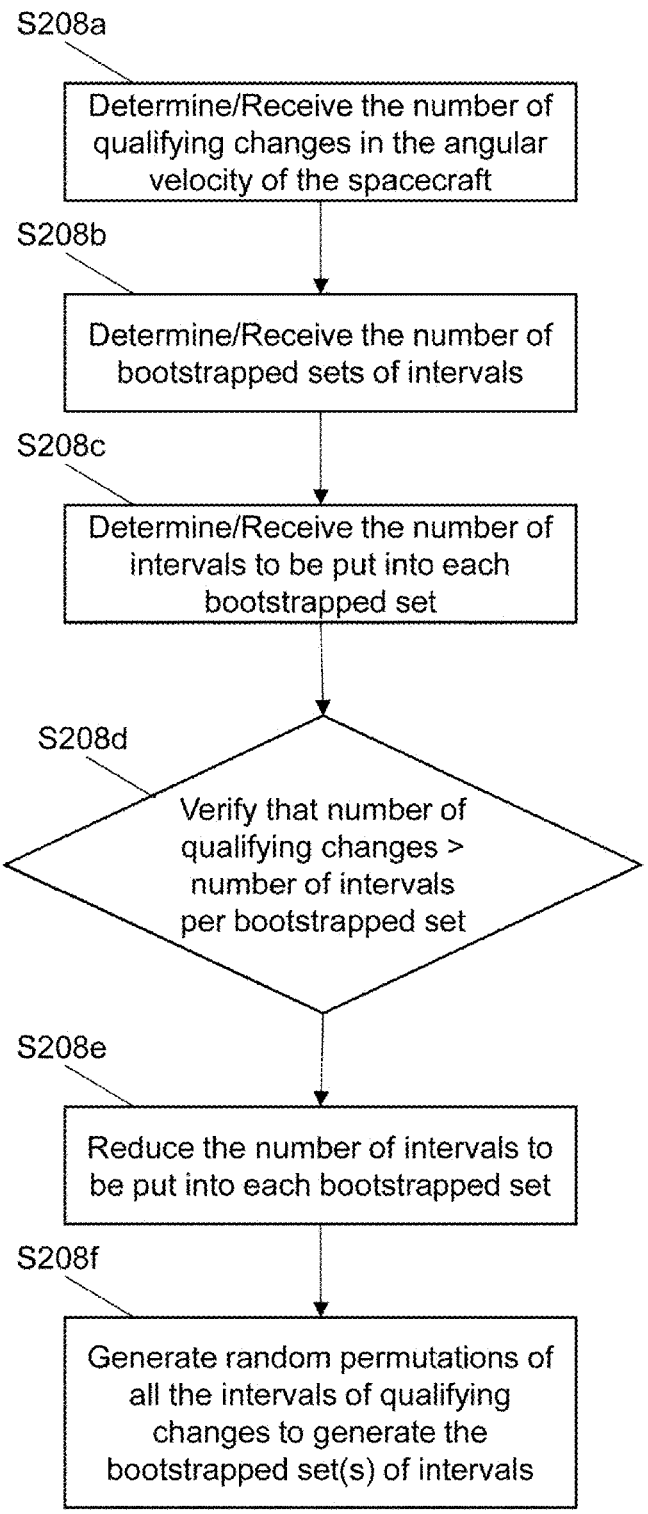
FIG. 4 shows a method of arranging a plurality of intervals into one or more sets of intervals as part of the method shown in FIG. 3.

FIG. 4 shows a method of arranging a plurality of intervals into one or more sets of intervals as part of operation S208 discussed above in relation to FIG. 3.

In a first operation S208a, the number of qualifying changes in angular velocity is determined or received as an input.

In another operation S208b, the number of bootstrapped sets of intervals is determined or received as an input. The number of bootstrapped sets of intervals may be stored as metadata and provided to the user of the methods described herein. Alternatively, the user may select the number of bootstrapped sets of intervals themselves. In some examples, a suggested number of bootstrapped sets of intervals may be stored as metadata and provided to the user. The user may then choose to accept the suggested number of bootstrapped sets of intervals as the number of bootstrapped sets of intervals or may choose their own preferred number of bootstrapped sets of intervals.

In another operation, S208c, the number of intervals to be put into each bootstrapped set of intervals is determined or received as an input. The number of intervals to be put into each bootstrapped set of intervals may be stored as metadata and provided to the user of the methods described herein. Alternatively, the user may select the number of intervals to be put into each bootstrapped set of intervals themselves. In some examples, a suggested number intervals to be put into each bootstrapped set of intervals may be stored as metadata and provided to the user. The user may then choose to accept the suggested number of intervals or may choose their own preferred number of intervals to be put into each bootstrapped set of intervals.

In the specific examples depicted in the Figures, there are 50 bootstrapped sets of intervals, with 80 intervals put into each bootstrapped set of intervals. The skilled person will, however, of course recognise that any number of bootstrapped sets of intervals and any number of intervals put into each bootstrapped set of intervals may be appropriate provided that there are more intervals of qualifying changes in angular velocity sampled from the dataset than are to be put into each bootstrapped set. In other words, a constraint on the number of intervals to be put into each bootstrapped set of intervals is that said number of intervals must not be greater than the number of intervals in the total dataset.

Operations S208a-S208c may be performed simultaneously or asynchronously in any order, as appropriate. Additionally, as is discussed elsewhere herein, operations S208a-S208c—as well as any other operations described herein—may be performed either on-board the spacecraft 110 or off-board the spacecraft, for example at a ground station on Earth.

A subsequent operation S208d may comprise verifying that there are more intervals corresponding to qualifying changes in the angular velocity than the number of intervals to be put into each bootstrapped set of intervals (noting that each interval may be put into one or more sets and any given interval may appear more than once within a given set).

If it is determined that the number of intervals to be put into each bootstrapped set of intervals is greater than or equal to the total number of intervals corresponding to qualifying changes in the angular velocity, then a subsequent operation S208e may comprise reducing the number of intervals to be put into each bootstrapped set of intervals to a predetermined percentage of the total number of intervals of qualifying changes in the angular velocity in the dataset. The predetermined percentage may be, for example, 90% or less, 80% or less, 70% or less, 60% or less, or 50% or less. In one particular example, the predetermined percentage may be 75%.

In some examples, operation S208e may further comprise flagging a warning to the user of the method that the number of intervals being put into each of the bootstrapped sets of intervals has been reduced. Following the conclusion of operation S208e, the method may proceed to operation S208f.

If, in operation S208d, it is determined that the number of intervals to be put into each bootstrapped set of intervals is less than the total number of intervals corresponding to qualifying changes in the angular velocity, then the method may proceed directly to operation S208f.

Operation S208f comprises generating the plurality of bootstrapped sets of intervals by generating random permutations of all of the intervals corresponding to qualifying changes in the angular velocity of the spacecraft and arranging each respective permutation into a set of intervals defining a bootstrapped set of intervals. Each of the intervals corresponding to qualifying changes in the angular velocity may be arranged into one or more bootstrapped sets of intervals. In some examples, each interval may only be arranged into a given bootstrapped set of intervals once. In other words, any one interval may be arranged into more than one different bootstrapped sets of intervals, but said interval may not be arranged into the same bootstrapped set of intervals multiple times. In other examples, each interval may be arranged into a given set of intervals any number of times. In other words, repetition of the same interval within a set of intervals may be permitted.

FIG. 5 shows a display interface 500 that may be presented to a user comprising the data returned to the user as part of operation S224 described above. Display interface 500 may comprise a plurality of data items 502-524.

A first data item 502 may comprise a definition of the time range over which the input angular velocity data was collected. The first data item may represent this time range in any suitable unit, for example minutes, hours, days, weeks or similar. In the example shown in FIG. 5, the first data item 502 indicates that the angular velocity data was collected over a 48-hour, or 2-day period.

A second data item 504 may comprise information indicative of the date and time at which the first angular velocity data was collected. For example, the second data item 504 may comprise a timestamp. In the example shown in FIG. 5, the second data item 502 indicates that the first part of the input angular velocity data was collected at 00:00:08 UTC on 12 Feb. 2022.

A third data item 506 may comprise information indicative of the data and time at which the final input angular velocity data was collected. For example, the third data item 506 may comprise a timestamp. In the example shown in FIG. 5, the third data item 506 indicates that the final input angular velocity data was collected at 23:59:44 UTC on 13 Feb. 2022.

A fourth data item 508 may comprise information indicative of the average sampling frequency with which the input angular velocity data was collected. The fourth data item 508 may be expressed in any suitable unit of frequency, for example Hertz. Alternatively, the fourth data item 508 may be expressed in a unit of time, for example seconds, indicative of the average time between consecutive sampling. This average time may be referred to as an average sampling time. In the example shown in FIG. 5, the fourth data item 508 indicates that the input angular velocity data was collected with an average sampling time of 8.96 seconds (equivalent to a sampling frequency of 0.112 Hertz).

A fifth data item 510 may comprise information indicative of the average interval width, that is the average timespan of an interval during which a qualifying change in the angular velocity of the spacecraft took place. The fifth data item 510 may be expressed in any suitable unit of time, for example seconds or minutes. In the example shown in FIG. 5, the fifth data item 510 indicates that the average timespan of the intervals is 35.85714 seconds.

A sixth data item 512 may comprise information indicative of the average angular speed of the spacecraft during the intervals corresponding to qualifying changes in the angular velocity of the spacecraft. The sixth data item 512 may be expressed in any suitable unit of angular speed, for example radians per second. In the example shown in FIG. 5, the sixth data item 512 indicates that the average angular speed of the spacecraft during the qualifying changes in angular velocity is $0.1354$ rad s$^{-1}$.

A seventh data item 514 may comprise information indicative of the total number of intervals identified as corresponding to a qualifying change in the angular velocity of the spacecraft. In the example shown in FIG. 5, the seventh data item 514 indicates that the total number of identified intervals is 28.

An eighth data item 516 may comprise information indicative of the total number of sets of intervals, as discussed above in relation to FIGS. 3 and 4. In the example shown in FIG. 5, the eighth data item 516 indicates that the total number of sets of intervals is 60.

A ninth data item 518 may comprise information indicative of the total number of intervals removed from the sets of intervals for being outliers. In the example shown in FIG. 5, the ninth data item 518 indicates that the total number of outlier intervals removed from the sets of intervals is 0.

A tenth data item 520 may comprise information indicative of the number of intervals put into each set of intervals, for example in accordance with the methods described herein in relation to FIG. 4 above. In the example shown in FIG. 5, the tenth data item 520 indicates that the number of intervals put into each set of intervals is 10.

An eleventh data item 522 comprises information indicative of the overall estimate for each component of the inertial properties of the spacecraft, wherein each estimate was determined in accordance with the methods described herein. The eleventh data item 522 may further comprise information indicative of the standard deviation in the estimate of each component of the inertial properties. The eleventh data item 522 may further comprise a confidence interval associated with each component of the estimated inertial properties. The confidence interval may be any of the confidence intervals discussed above. The data may be expressed in any suitable unit for inertial properties, for example kg m$^2$. In the example shown in FIG. 5, the eleventh data item 522 is provided as a table:

| Parameter | Estimate [kg m$^2$] | Standard Deviation [kg m$^2$] | 95% Confidence interval[kg m$^2$] |
|---|---|---|---|
| $I_{xx}$ | 10.030 | 0.074 | 10.011-10.049 |
| $I_{yy}$ | 43.466 | 0.298 | 43.391-43.542 |
| $I_{zz}$ | 39.714 | 0.095 | 39.690-39.738 |
| $I_{xy}$ | −0.416 | 0.146 | −(0.453-0.379) |
| $I_{xz}$ | −0.007 | 0.051 | −(0.020-0.006) |
| $I_{yz}$ | −0.355 | 0.091 | −(0.378-0.332) |

A twelfth data item 524 may comprise information indicative of whether the overall estimate of the inertial properties is physically plausible, for example whether the overall estimate passed the verification performed in operation S218 above. In the example shown in FIG. 5, the twelfth data item indicates that the overall estimate for the inertial properties of the spacecraft did pass the verification performed in operation S218.

A thirteenth data item 526 may comprise information indicative of a smoothness metric of the angular velocity data, for example determined in accordance with the methods described above in relation to FIG. 4. In the example shown in FIG. 5, the thirteenth data item 526 indicates that the smoothness metric of the angular velocity data is 0.00328 N m s.

Figure 6:
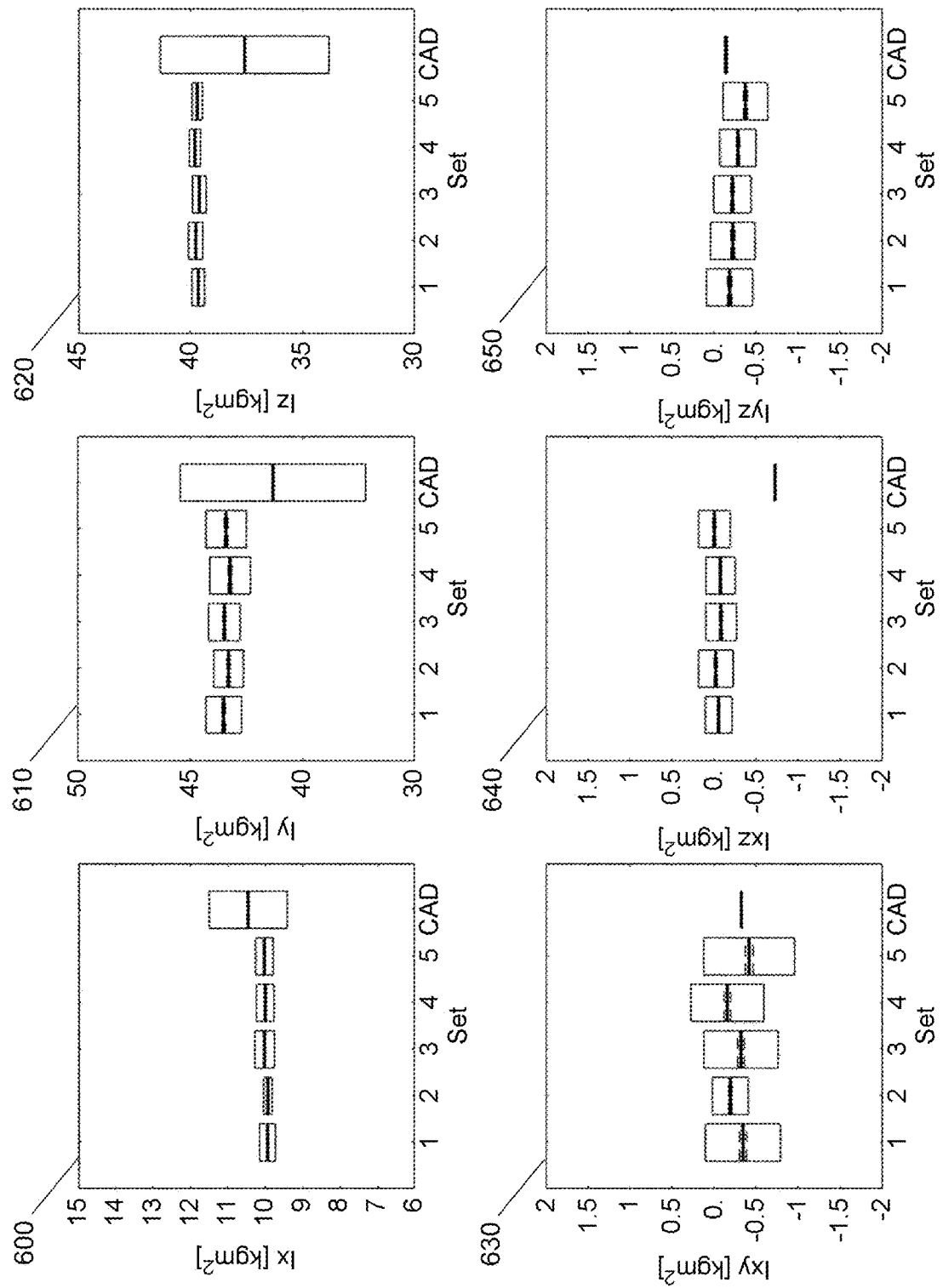
FIG. 6 shows a plurality of bar diagrams comparing the results of several iterations of the method shown in FIG. 3.

FIG. 6 shows a plurality of bar diagrams 600, 610, 620, 630, 640, 650 comparing the results of several iterations of the methods described herein for one particular satellite 100 for each component of the inertial properties of the satellite 100, wherein the method was repeated over the course of several days. Each of the bar diagrams 600, 610, 620, 630, 640, 650 relate to a different component of the inertial properties of the spacecraft. Each bar labelled 1-5 in the respective bar diagram shows the set estimates for the inertial properties (indicated by the central line of the bar), with the extent of each of the bars providing information indicative of the standard deviation of each set estimate. Each bar diagram 600, 610, 620, 630, 640, 650 also include a bar indicative of an estimate and standard deviation in in the estimate of the inertial properties based on CAD analysis. As mentioned above, CAD analysis is known to typically underestimate the 'true' inertial properties of a spacecraft 100 in flight, and so the results depicted in FIG. 6 are indicative of the accuracy of the methods described herein.

Figure 7:
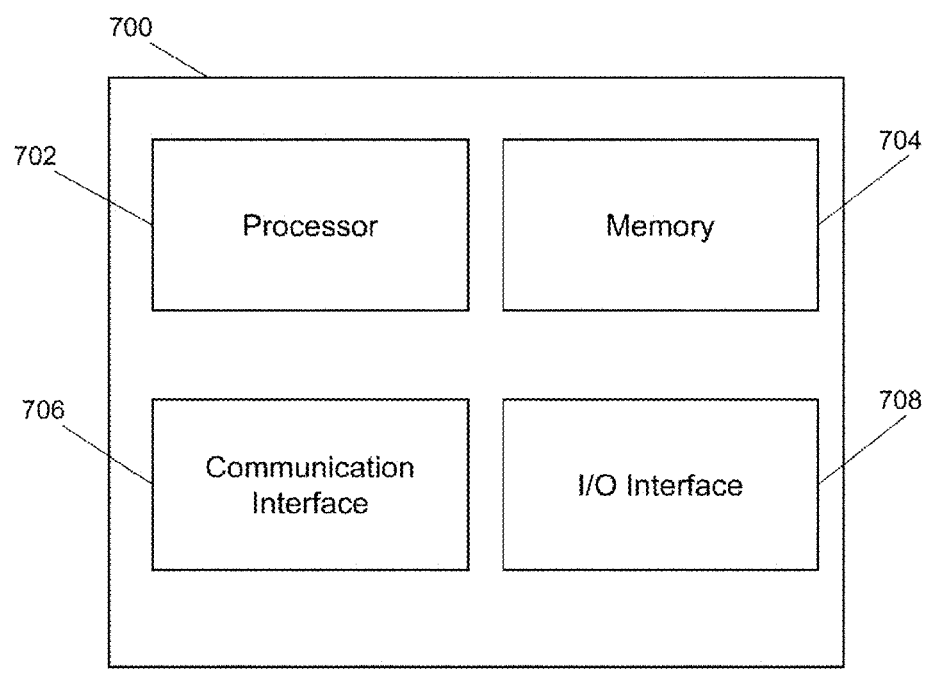
FIG. 7 shows a schematic of an example computer suitable for carrying out the methods described herein.

FIG. 7 depicts a schematic of a computer apparatus 700 configurable to carry out the methods described herein. The computer apparatus 700 comprises a processor 702 configured to execute logic that causes the computer apparatus 700 to carry out the methods described herein. The computer apparatus further comprises a memory 704 for storing data, a communication interface 706 for receiving angular velocity data (amongst other data) from the spacecraft-either directly or indirectly, and an I/O interface for receiving metadata or other data from the user, and for providing the estimate and other data items set out in FIG. 5 to the user. A display, not shown, may be provided to output results, such as those shown in FIG. 6, to a user.

In the embodiments described above, the computing apparatus may be configured as a server, for example serving estimates of inertial properties in response to receiving input data. The computer apparatus may comprise a single computer or server or a network of computers or servers. In some examples, the functionality of the server may be provided by a network of servers distributed across a geographical area, such as a worldwide distributed network of servers, and a user may be connected to an appropriate one of the network servers based upon, for example, a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and Blu-ray® disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fibre optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A method of determining one or more inertial properties of a spacecraft, the method comprising:
   receiving data collected at different points in time during operation of the spacecraft, the data including information indicative of:
      the angular momentum of a reaction wheel on-board the spacecraft, and
      the angular velocity of the spacecraft;
   identifying changes in the angular velocity of the spacecraft based on the information indicative of the angular velocity of the spacecraft; and
   determining one or more inertial properties of the spacecraft based on the identified changes in the angular velocity of the spacecraft and the information indicative of the angular momentum of the reaction wheel, characterized in that the determining the one or more inertial properties comprises:
   identifying a plurality of time intervals, each interval corresponding to a change in the angular velocity of the spacecraft upon which the determining is to be based;
   randomly sampling the plurality of time intervals to generate one or more sets of intervals, wherein the number of time intervals within each of the sets of intervals is less than the total number of time intervals;
   for each set of intervals, determining a set estimate of the inertial properties based on the plurality of time intervals in the respective set of intervals; and
   combining the one or more set estimates of the inertial properties to determine an overall estimate of the inertial properties.

2. The method according to claim 1, wherein the data is collected during one or more manoeuvers of the spacecraft to maintain or change orbit.

3. The method according to claim 1, wherein the spacecraft comprises synthetic aperture radar apparatus and the data is collected during one or more manoeuvers of the spacecraft to maintain an imaging target within the radar aperture.

4. The method according to claim 1, wherein the inertial properties comprise one or more of moments and products of inertia of the spacecraft.

5. The method according to claim 1, wherein identifying changes in the angular velocity of the spacecraft comprises:
identifying qualifying changes in the angular velocity of the spacecraft from the information indicative of the angular velocity of the spacecraft, wherein qualifying changes in the angular velocity are changes that satisfy one or more of:
exceeding a predetermined lower threshold,
not exceeding a predetermined upper threshold, and
occurring within a predetermined time interval;
wherein the determining of the one or more inertial properties of the spacecraft is based on the identified qualifying changes in the angular velocity of the spacecraft.

6. The method according to claim 1, comprising determining a precision of the overall estimate of the inertial properties based on the one or more set estimates.

7. The method according to claim 1, comprising determining a confidence interval for the overall estimate based on the one or more set estimates.

8. The method according to claim 1, comprising verifying that the estimate of the inertial properties lies within a predetermined range, and/or verifying that each component of the inertial properties lies within a predetermined range.

9. The method according to claim 1, wherein the received data is telemetry data associated with the spacecraft.

10. The method according to claim 1, wherein the received data is collected with a sampling frequency of 5 Hz or less, 2 Hz or less, 1 Hz or less, 0.5 Hz or less, 0.2 Hz or less, 0.1 Hz or less, 0.05 Hz or less, or 0.01 Hz or less.

11. The method according to claim 1, wherein the spacecraft is a satellite in orbit around the Earth.

12. The method according to claim 11, wherein the satellite is in a low-Earth orbit.

13. The method according to claim 1, wherein the spacecraft has a mass of 5 tonnes or less, 2 tonnes or less, or 1 tonne or less.

14. A computing device comprising a processor configured to carry out a method of determining one or more inertial properties of a spacecraft, the method comprising:
receiving data collected at different points in time during operation of the spacecraft, the data including information indicative of:
the angular momentum of a reaction wheel on-board the spacecraft, and
the angular velocity of the spacecraft;
identifying changes in the angular velocity of the spacecraft based on the information indicative of the angular velocity of the spacecraft; and
determining one or more inertial properties of the spacecraft based on the identified changes in the angular velocity of the spacecraft and the information indicative of the angular momentum of the reaction wheel, wherein determining the one or more inertial properties comprises:
identifying a plurality of time intervals, each interval corresponding to a change in the angular velocity of the spacecraft upon which the determining is to be based;
randomly sampling the plurality of time intervals to generate one or more sets of intervals, wherein the number of time intervals within each of the sets of intervals is less than the total number of time intervals;
for each set of intervals, determining a set estimate of the inertial properties based on the plurality of time intervals in the respective set of intervals; and
combining the one or more set estimates of the inertial properties to determine an overall estimate of the inertial properties.

15. A computer-readable medium comprising logic that, when executed by a computer causes the computer to carry out a method of determining one or more inertial properties of a spacecraft, the method comprising:
receiving data collected at different points in time during operation of the spacecraft, the data including information indicative of:
the angular momentum of a reaction wheel on-board the spacecraft, and
the angular velocity of the spacecraft;
identifying changes in the angular velocity of the spacecraft based on the information indicative of the angular velocity of the spacecraft; and
determining one or more inertial properties of the spacecraft based on the identified changes in the angular velocity of the spacecraft and the information indicative of the angular momentum of the reaction wheel, wherein determining the one or more inertial properties comprises:
identifying a plurality of time intervals, each interval corresponding to a change in the angular velocity of the spacecraft upon which the determining is to be based;
randomly sampling the plurality of time intervals to generate one or more sets of intervals, wherein the number of time intervals within each of the sets of intervals is less than the total number of time intervals;
for each set of intervals, determining a set estimate of the inertial properties based on the plurality of time intervals in the respective set of intervals; and
combining the one or more set estimates of the inertial properties to determine an overall estimate of the inertial properties.

16. A computer program product comprising instructions that, when executed by a computer, cause the computer carry out a computer-implemented method of determining one or more inertial properties for accurate control of a spacecraft, the method comprising:
receiving data collected at different points in time during operation of the spacecraft, the data including information indicative of:
the angular momentum of a reaction wheel on-board the spacecraft, and
the angular velocity of the spacecraft;
identifying changes in the angular velocity of the spacecraft based on the information indicative of the angular velocity of the spacecraft; and
determining one or more inertial properties of the spacecraft based on the identified changes in the angular velocity of the spacecraft and the information indicative of the angular momentum of the reaction wheel, wherein determining the one or more inertial properties comprises:
identifying a plurality of time intervals, each interval corresponding to a change in the angular velocity of the spacecraft upon which the determining is to be based;
randomly sampling the plurality of time intervals to generate one or more sets of intervals, wherein the number of time intervals within each of the sets of intervals is less than the total number of time intervals;
for each set of intervals, determining a set estimate of the inertial properties based on the plurality of time intervals in the respective set of intervals; and combining the one or more set estimates of the inertial properties to determine an overall estimate of the inertial properties.

\* \* \* \* \*